United States Patent
Richter

(10) Patent No.: US 7,161,811 B2
(45) Date of Patent: Jan. 9, 2007

(54) CARD HOLDER FOR SIM CARD

(75) Inventor: Michael Richter, Schalksmühle (DE)

(73) Assignee: Lumberg Connect GmbH & Co. KG, Schalksmuhle (DE)

( * ) Notice: Subject to any disclaimer, the term of this patent is extended or adjusted under 35 U.S.C. 154(b) by 0 days.

(21) Appl. No.: 11/073,923

(22) Filed: Mar. 3, 2005

(65) Prior Publication Data

US 2005/0199710 A1    Sep. 15, 2005

(30) Foreign Application Priority Data

Mar. 12, 2004  (DE) .................. 10 2004 012 621
Jan. 27, 2005  (EP) .................. 05001634

(51) Int. Cl.
*H05K 7/16* (2006.01)
*H01R 13/62* (2006.01)

(52) U.S. Cl. .............. 361/737; 439/945; 439/946; 439/326

(58) Field of Classification Search .......... 361/737, 361/755; 439/326, 945, 946, 630, 541.5
See application file for complete search history.

(56) References Cited

U.S. PATENT DOCUMENTS

| | | | | |
|---|---|---|---|---|
| 5,226,826 A | * | 7/1993 | Nillson et al. ............... 439/72 |
| 5,603,629 A | * | 2/1997 | DeFrasne et al. ........... 439/331 |
| 6,149,466 A | * | 11/2000 | Bricaud et al. ............. 439/630 |
| 6,174,188 B1 | * | 1/2001 | Martucci ..................... 439/326 |
| 6,220,882 B1 | * | 4/2001 | Simmel et al. ............. 439/326 |
| 6,743,035 B1 | | 6/2004 | Yang |
| 6,805,570 B1 | * | 10/2004 | Lee ............................. 439/326 |
| 6,869,302 B1 | * | 3/2005 | Bricaud et al. ............. 439/326 |
| 6,881,086 B1 | * | 4/2005 | Ohashi ........................ 439/326 |

FOREIGN PATENT DOCUMENTS

| | | |
|---|---|---|
| EP | 0981796 | 2/2000 |
| FR | 2763412 | 11/1998 |

* cited by examiner

*Primary Examiner*—Elvin Enad
*Assistant Examiner*—Dameon E. Levi
(74) *Attorney, Agent, or Firm*—Andrew Wilford

(57) ABSTRACT

A card holder has a generally flat and rectangular plastic base fixed to a support, e.g. a printed-circuit board of a card reader, and formed centered on an axis with a pair of pivot pins. A generally rectangular and flat metal cover forming a slot dimensioned to hold the card is unitarily formed with a pair of U-shaped journals each fitting partially around a respective one of the pins and forming therewith a hinge. Thus the cover can pivot between an open position with the cover and the card in the slot partially raised from the base and a closed position with the cover and the card in the slot closely juxtaposed with the base.

13 Claims, 6 Drawing Sheets

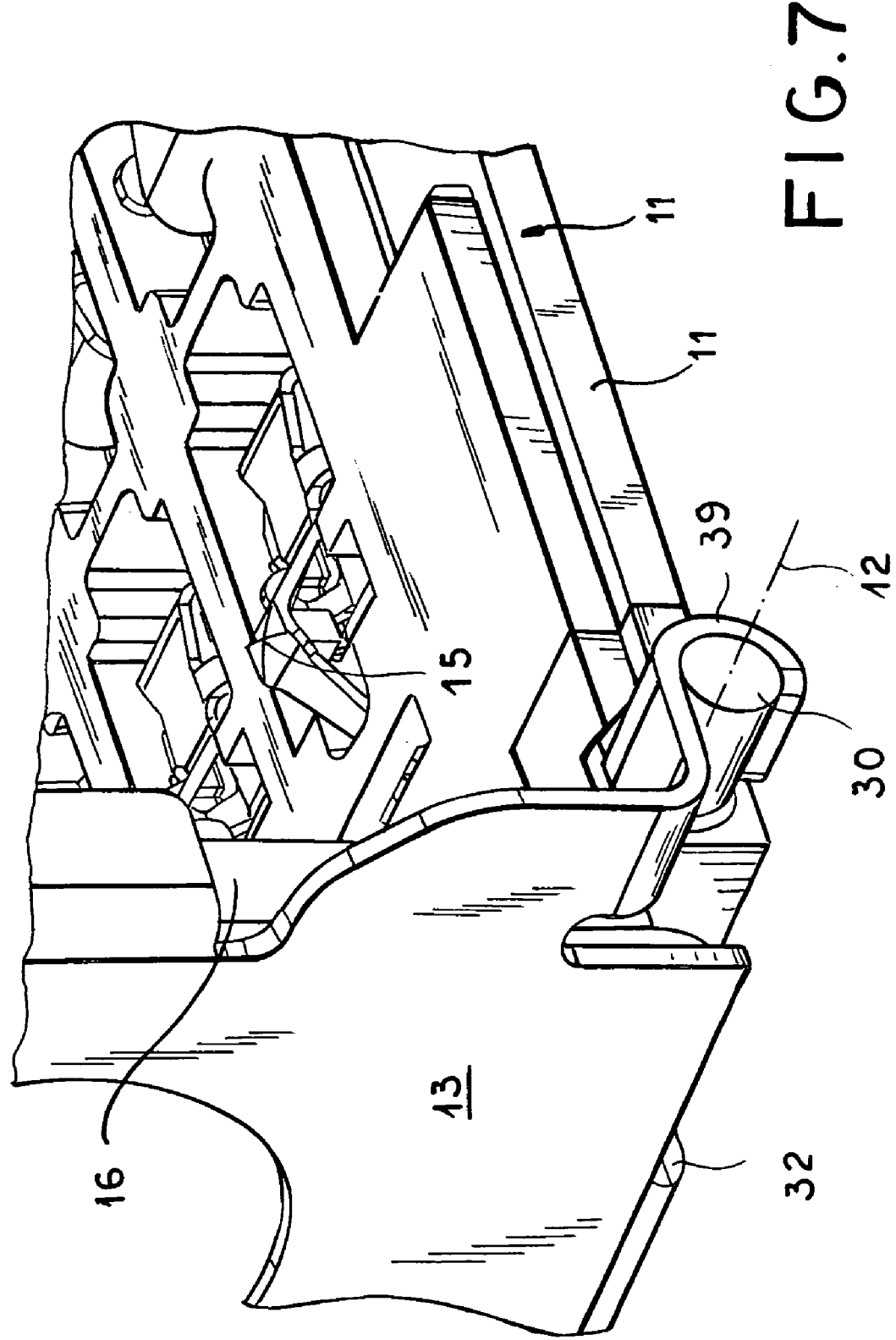

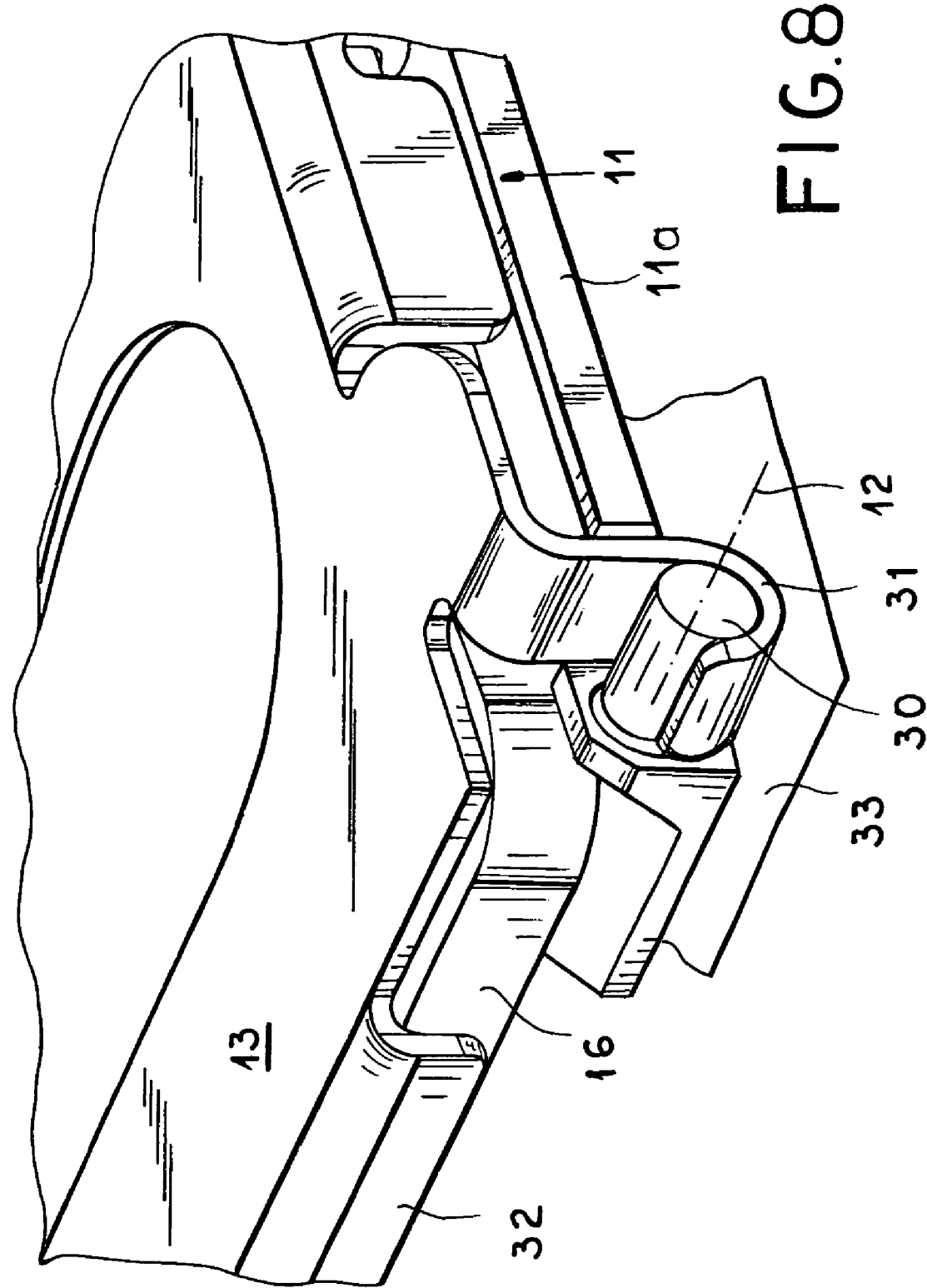

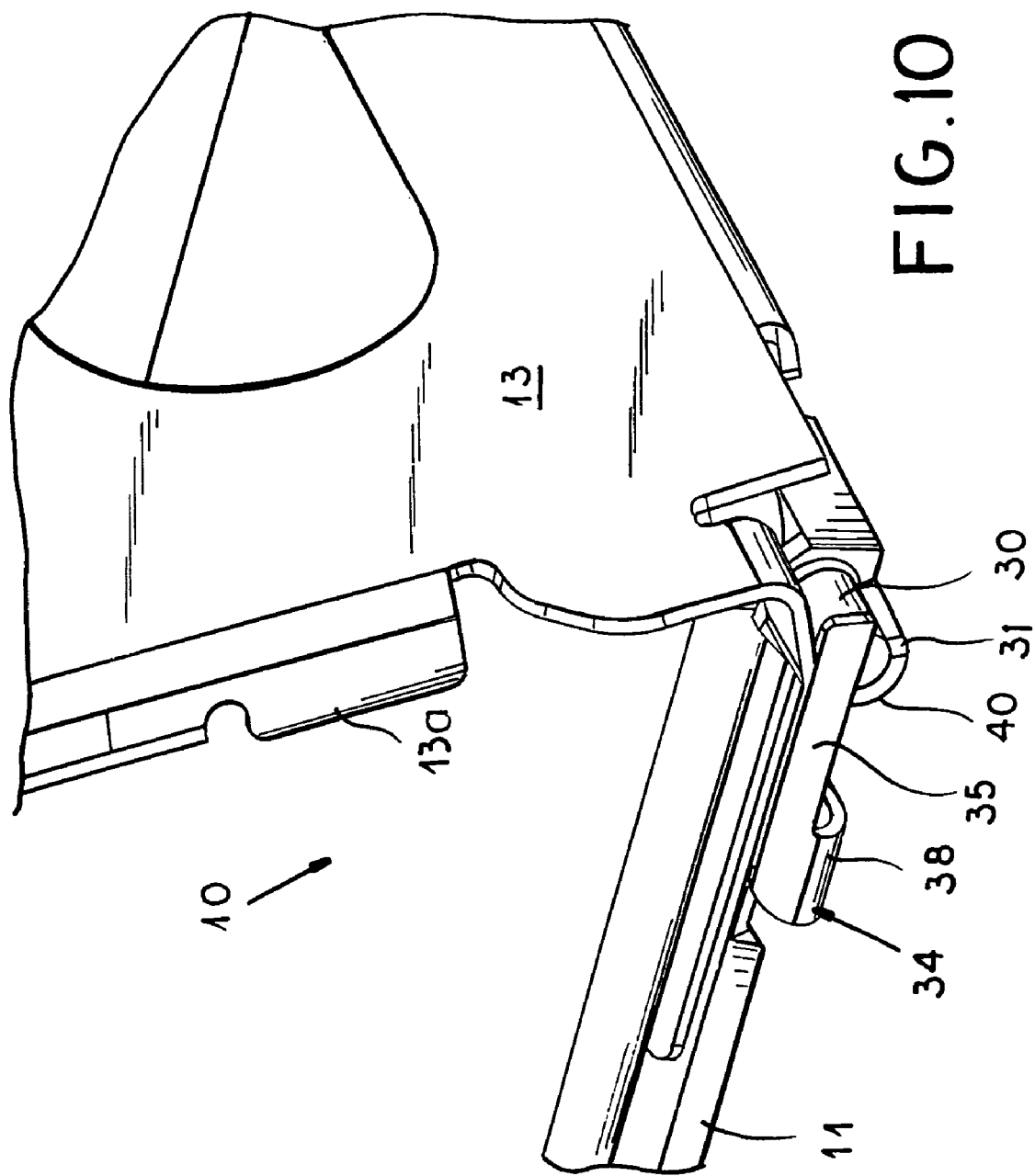

US 7,161,811 B2

CARD HOLDER FOR SIM CARD

FIELD OF THE INVENTION

The present invention relates to a card holder. More particularly this invention concerns a card holder for a chip or SIM card such as is used in a cellular telephone.

BACKGROUND OF THE INVENTION

A smart card, also known as an IC-card or a chip card, is a flat normally plastic card that may be as large as a credit card or, in particular when used as an SIM (subscriber identity module), as small as a postage stamp. Such a card carries active and passive circuit elements. When used, for instance, as a SIM card it has a small processor and enough memory to hold data regarding the identity and preferences of a user. Such a SIM card is commonly used in a cellular telephone to allow a user to transfer his or her phone book and other data from one phone to another.

The card reader must fulfill several functions in addition to the obvious one of forming connections between contact points on the card and traces of the printed-circuit board normally carrying the holder. First of all it must hold and protect the card physically, something that is particularly important as, for instance, in a cell phone the card holder is in the bottom of the battery compartment where it is exposed as batteries are changed. In addition the card holder must shield the card, in particular from inductive and RF (radio-frequency) fields, another problem particularly present in a cell phone where the card is located a few centimeters from a transmitter.

Thus the typical card holder as described in U.S. Pat. No. 5,226,826 has a cover provided with flanges forming a slot into which the card can be slid. The cover is pivotal on a plastic base between an open position in which the slot is exposed for insertion and removal of the card and a closed position flush with the base. Spring contacts in the base bear against terminals on the card in the closed position, and in turn are connected to SMD (surface-mount device) contacts that themselves is are soldered to a circuit board or similar support in the device equipped with the card holder.

For best shielding, the standard practice is to make the cover of electrically conductive material, normally metal, and to ground it. The holder can have contacts in the base that engage the cover as in U.S. Pat. No. 5,718,609. Such systems have the disadvantage that the ground connection is not sure. Such use of ground contacts in the base engaging the cover means that another SMD connection must be made between the ground contacts in the base and the support, normally a circuit board, to which the base is fixed, and this extra connection is also capable of failure.

In an improved system described in U.S. patent application Ser. No. 10/633,883 the card holder has a dielectric base fixed to the support and formed with a throughgoing cutout exposing the grounded support and a conductive cover forming a slot dimensioned to hold the card. A hinge on the dielectric base pivotally carries the conductive cover for movement between an open position with the cover and the card in the slot partially raised from the base and a closed position with the cover and the card in the slot closely juxtaposed with the base and covering the cutout. A ground contact carried on and electrically connected to the cover is positioned to engage through the cutout directly with the grounded support in the closed position of the cover.

While such a card holder is a distinct improvement, it is subject to improvement. First of all, it must be as compact as possible, not significantly exceeding the dimensions of the card it holds. Second, it should be constructed robustly, but so that it is not damaged even if handled roughly, for instance if it is opened too far. Third, the card holder should provide good ESD (electrostatic discharge) protection, that is ensure a good ground under all circumstances, even when the holder is open.

OBJECTS OF THE INVENTION

It is therefore an object of the present invention to provide an improved card holder for a SIM card.

Another object is the provision of such an improved card holder for SIM card that overcomes the above-given disadvantages, in particular that is extremely compact and of simple construction, and that is resistant to damage if handled roughly on changing the SIM card.

A further object is to provide improved ESD protection for such a card holder.

SUMMARY OF THE INVENTION

A card holder according to the invention has a generally flat and rectangular plastic base fixed to a support, e.g. a printed-circuit board of a card reader of a cell phone, and formed centered on an axis with a pair of pivot pins. A generally rectangular and flat metal cover forming a slot dimensioned to hold the card is unitarily formed with a pair of U-shaped journals each fitting partially around a respective one of the pins and forming therewith a hinge. Thus the cover can pivot between an open position with the cover and the card in the slot partially raised from the base and a closed position with the cover and the card in the slot closely juxtaposed with the base.

Such a construction is extremely simple. The base is mounted on the support typically by soldering contacts on it to traces on the printed-circuit support. The cover is made of one piece of sheet metal and is unitarily formed with the journals. Similarly the pins are unitary with the base, normally formed when the base is made by injection molding.

The pins project axially oppositely from the cover and from each other. The journals are formed as concave seats at the outer ends of tongues bent out of the sheet metal of the cover and grip around the respective pins through about 180°. When the journals extend over slightly more than 180° relative to the axis and fit snugly around the respective pins, the pins are captured in the respective journals. Such capturing does not however completely prevent the cover from being separated from the base. Thus if the cover is pushed into the open position when it abuts the base or support and then is pushed further, the journals will deform slightly elastically and come up off the pins, completely separating the cover from the base with damage to neither the cover nor the base. When the journals extend over slightly less than 180° relative to the axis and fit snugly around the respective pins separation of the cover is even easier and can be handy to adapt the holder to a SIM card of slightly different dimensions.

The journals flank a projecting end of the support or of the base so that the cover is axially fixed to the base. In addition the card has a cut-off corner and the cover is formed with corner stop complementarily fittable with the cut-off corner when the card is fitted properly to the slot. The cover has adjacent the axis an edge that abuts the support in the open position. In the open position the cover forms an angle of about 70° to the support and base.

The cover in accordance with the invention is formed of sheet metal with a pair of projecting tongues forming the journals. The holder further has according to the invention a ground element fixed and grounded to the support and having a tab bearing elastically against one of the tongues. This one tongue has an edge lying in a plane perpendicular to the axis and engaged continuously in all positions of the cover with the tab. The edge engaged by the ground element is either an inner edge of the one tongue turned toward the other tongue or an outer edge of the one tongue turned away from the other tongue. The ground element has another tab engaged flatly under the base with the support.

BRIEF DESCRIPTION OF THE DRAWING

The above and other objects, features, and advantages will become more readily apparent from the following description, reference being made to the accompanying drawing in which:

FIG. 7 is a large-scale view of a detail of the open card holder of FIG. 5;

FIG. 8 is a large-scale view of a detail of FIG. 7;

FIG. 10 is a view like FIG. 9 of another variant on the card holder.

SPECIFIC DESCRIPTION

Figure 1:
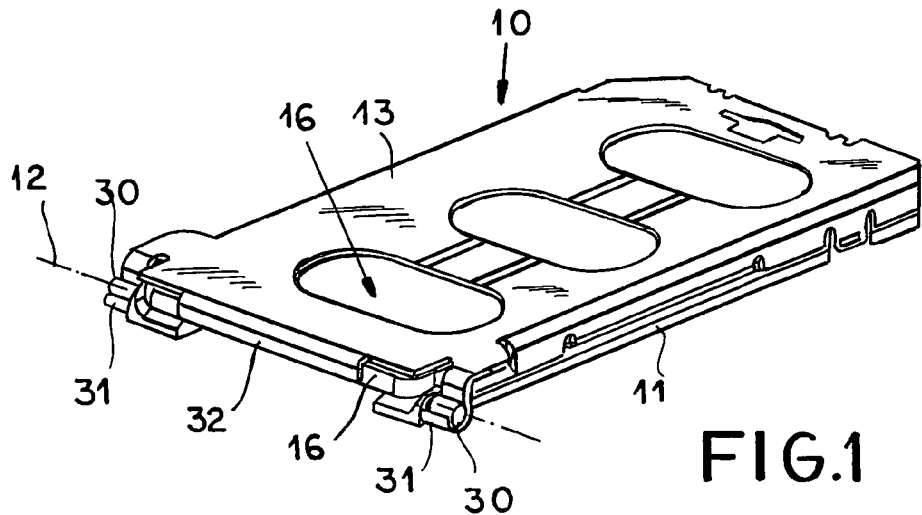
FIG. 1 is a perspective view of a card holder according to the invention in the closed position.
Figure 2:
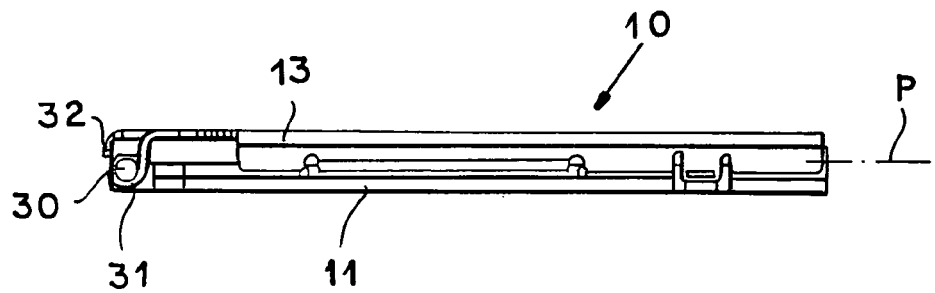
FIG. 2 is a side view of the closed card holder of FIG. 1.

As seen in FIGS. 1 to 8, a card holder 10 according to the invention basically comprises a dielectric molded-plastic base 11 of rectangular shape and a similarly rectangular conductive sheet-metal cover 13 pivoted about a transverse axis 12 on the base 11 and having bent over edges 13a forming a slot 14 open radially away from the axis 12. The base 11 is provided with standard spring-type reader contacts 15 engageable with an SIM card 16 that fits in the slot 14 on the underside of the cover 13. Unillustrated SMD contacts associated with the contacts 15 are exposed at a bottom plane of the base 11 and serve for connection to grounded traces of a support, here a printed-circuit board 33 carried on an electrical device, here a cell phone. One corner of the base 11 has a stop 17 to ensure proper orientation of the card 16 which has a beveled corner as is well known in the art. The cover 13 is pivotal relative to the base 11 about the axis 12 between the closed position of FIGS. 1 to 4 and 8 the open position of FIGS. 5, 6, and 7.

Figure 9:
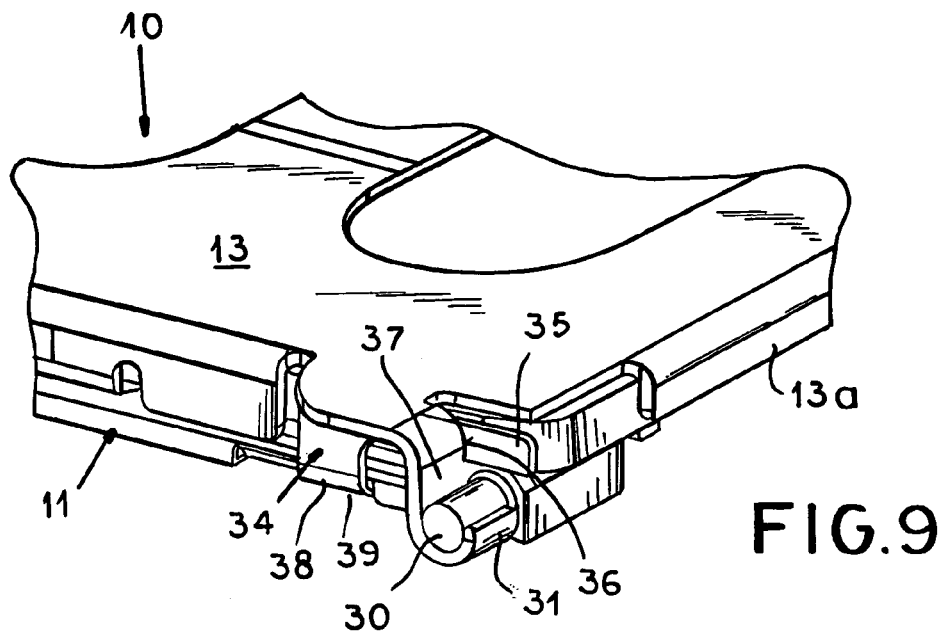
FIG. 9 is a large-scale view of a variant on the card holder according to the invention.
Figure 3:
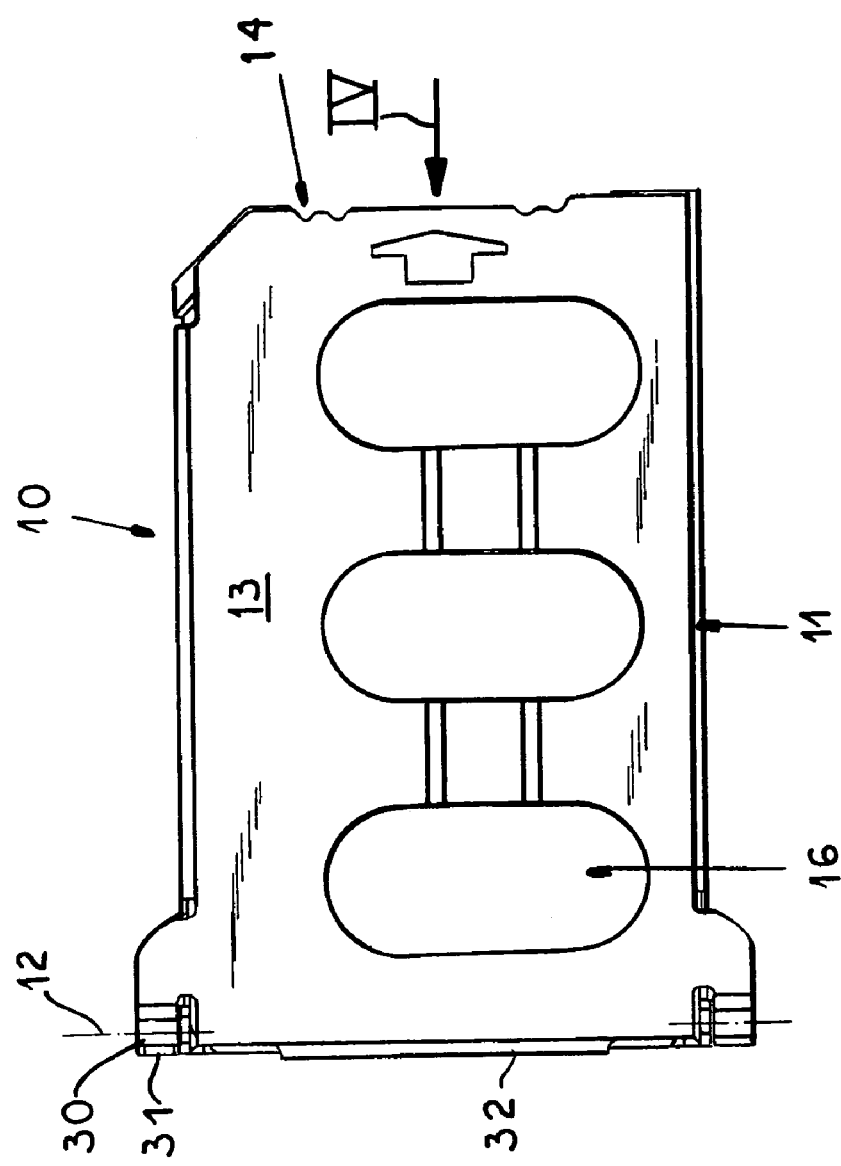
FIG. 3 is a top view of the closed card holder of FIG. 1.
Figure 4:
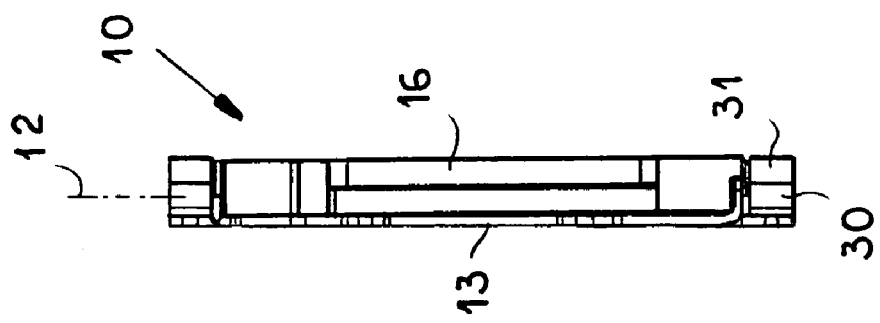
FIG. 4 is an end view of the closed card holder of FIG. 1.

According to the invention the axis 12 is defined by a pair of coaxial pins 30 unitarily molded with and extending oppositely and outwardly from long sides 11a of the base 11. The cover 13 in turn is unitarily formed with a pair of semicylindrical journals 31 each extending about 180° relative to the axis 12 and fitted in the closed position underneath the respective pins 30. As shown in FIG. 9, each journal 31 is simply formed as the outer end of a bent-out tongue 37 formed of the same sheet metal as the rest of the cover 13. The journals 31 are hooked under the pins 30 and form hinges with them. The semicylindrical journals 31 are open perpendicularly away from the plane P (FIG. 2) of the assembly in the closed position of FIGS. 1 to 4 and 7. These pins 30 and journals 31 flank the inner end of the card 16, that is the inner end of the card 16 is between them, so that the overall length perpendicular to the axis 12 of the holder 10 is only slightly greater than the overall length of the card 16 in this directions.

Figure 5:
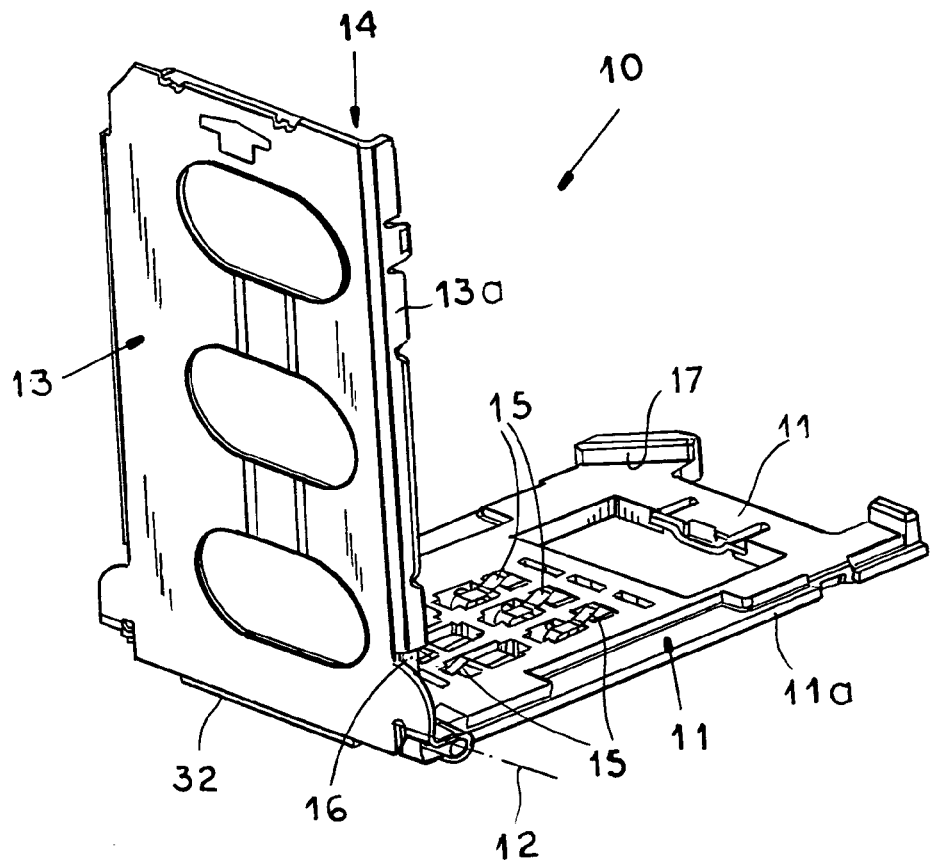
FIG. 5 is a perspective view of the card holder in the open position.
Figure 6:
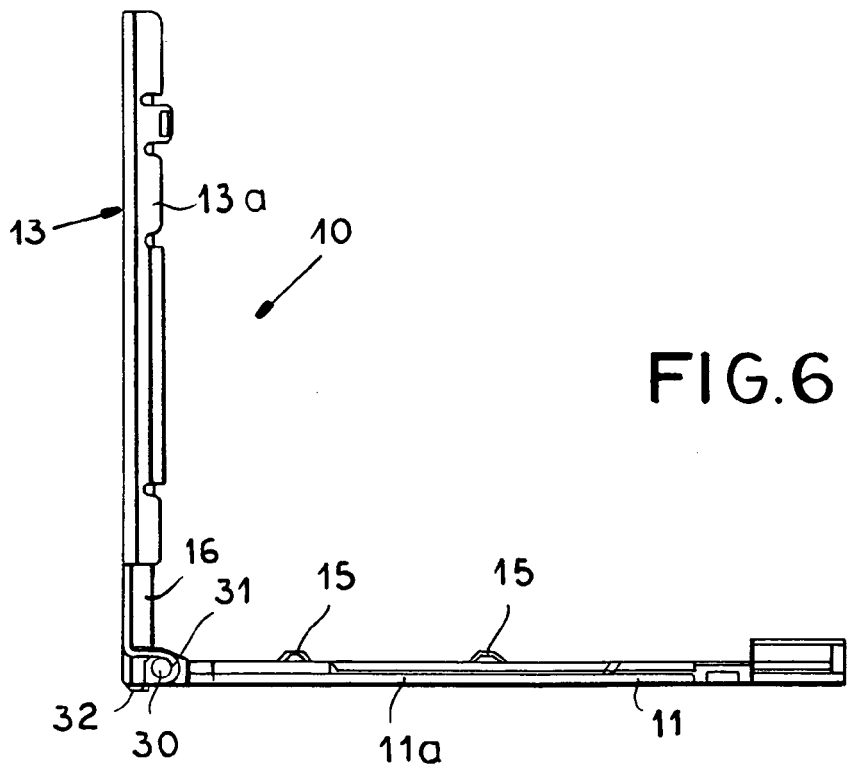
FIG. 6 is a side view of the open card holder.

In the open position of FIGS. 5, 6, and 7 a planar lip 32 projecting perpendicular to the plane of the cover 13 engages the end of the base 11, inhibiting further pivoting of the cover 13 and also defining the inner end of the card-holding slot 14. Thus, if the journals 31 extend over slightly more than 180°, the cover 13 can only pivot up through about 70° but if the journals 31 extend over slightly less than 180° the cover can pivot up through correspondingly more than 90°. Under any situation, if the cover 13 is forced further back when in the fully open position with the lip 32 butting the inner end of the base 11 as shown in FIGS. 6 and 7, there will be no damage to the structure, but instead the semicylindrical journals 31 will simply slip forward off the pins 31, deforming slightly if they extend over more than 180°. The cover 13 will come loose with no damage to itself or to the base 11, and can easily be fitted back onto the pins 30.

FIGS. 9 and 10 show how the holder 10 according to the invention can be equipped with a grounding element 34 formed of sheet metal with a tab or leg 35 bearing axially either against an inside edge 36 or an outside edge 40 of the journal 31 as shown in respective FIGS. 9 and 10. The element 34 has a lower tab 38 that engages underneath the base 11 and that is typically soldered to a ground trace on the circuit board 33. With this arrangement there is a good ground connection regardless of the angular position of the cover 13.

I claim:

1. In combination with a support and a smart card, a card holder comprising:

a plastic base fixed to the support and formed centered on an axis with a pair of cylindrical pivot pins; and a cover forming a slot dimensioned to hold the card and unitarily wholly formed of sheet metal with a pair of U-shaped journals each fitting snugly partially around a respective one of the pins, extending over less than 180° relative to the axis, and forming with the pins a hinge pivotally carrying the conductive cover for movement between an open position with the cover and the card in the slot partially raised from the base and a closed position with the cover and the card in the slot closely juxtaposed with the base, the cover further having adjacent the axis an edge that abuts the support in the open position and that cams the journals off the pins when the cover is forced past the open position.

2. The card holder defined in claim 1 wherein the pins are unitary with the base.

3. The card holder defined in claim 1 wherein the pins project axially oppositely from the cover and from each other.

4. The card holder defined in claim 1 wherein the journals flank a projecting end of the support.

5. The card holder defined in claim 1 wherein the journals are radially separable from the respective pins in the open position.

6. The card holder defined in claim 5 wherein the journals are elastically deformable to separate in the open position from the respective pins without damage to the journals and the pins.

7. The card holder defined in claim 1 wherein the card has a cut-off corner and the cover is formed with corner stop complementarily fittable with the cut-off corner when the card is fitted properly to the slot.

8. The card holder defined in claim 1 wherein in the open position the cover forms an angle of about 70° to the support and base.

9. The card holder defined in claim 1 wherein the sheet metal of the cover forms a pair of projecting tongues forming the journals, the holder further comprising a ground element fixed and grounded to the support and having a tab bearing elastically against one of the tongues.

10. The card holder defined in claim 9 wherein the one tongue has an edge lying in a plane perpendicular to the axis and engaged continuously in all positions of the cover with the tab.

11. The card holder defined in claim 10 wherein the edge is an inner edge of the one tongue turned toward the other tongue.

12. The card holder defined in claim 10 wherein the edge is an outer edge of the one tongue turned away from the other tongue.

13. The card holder defined in claim 9 wherein the ground element has another tab engaged flatly under the base with the support.

* * * * *